(12) United States Patent
Palen (10) Patent No.: US 8,122,970 B2
(45) Date of Patent: Feb. 28, 2012

(54) DUPLEX FRAME HINGE FOR FARM IMPLEMENT

(75) Inventor: Nelson J. Palen, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/632,171

(22) Filed: Dec. 7, 2009

(65) Prior Publication Data

US 2011/0131762 A1 Jun. 9, 2011

(51) Int. Cl.
*A01B 73/00* (2006.01)

(52) U.S. Cl. ........................................ 172/311; 172/776

(58) Field of Classification Search .................. 172/126, 172/128, 132, 311, 430, 224, 230–234, 776, 172/456; 111/25, 33; 239/166; 171/6
See application file for complete search history.

(56) References Cited

U.S. PATENT DOCUMENTS

| | | | |
|---|---|---|---|
| 2,754,647 A | 7/1956 | Bennett | |
| 3,505,704 A | 4/1970 | Hornung | |
| 4,058,170 A | 11/1977 | Ankenman | |
| 4,328,869 A | 5/1982 | Perelli | |
| 4,576,238 A | 3/1986 | Spencer | |
| 4,660,651 A * | 4/1987 | Pfenninger et al. | 172/311 |
| 4,878,545 A | 11/1989 | Dyken | |
| 5,542,190 A * | 8/1996 | Wahls | 33/624 |
| 5,573,070 A * | 11/1996 | Meek et al. | 172/131 |
| 5,921,325 A | 7/1999 | Meek et al. | |
| 2002/0074139 A1 | 6/2002 | Ankenman | |
| 2006/0065413 A1 | 3/2006 | Hoehn et al. | |

OTHER PUBLICATIONS

PCT International search report for International Application No. PCT/IB2010/003016 Dated May 16, 2011.

* cited by examiner

*Primary Examiner* — Robert Pezzuto (57) ABSTRACT

A duplex hinge having two pivot points. In one embodiment, the hinge is used between sections of multi-sectional farm implements to allow flex during field operations as well as folding for road transport. One pivot point is active both when folding and during field operations. The other pivot point is active during field operations but rigid while folding for road transport.

21 Claims, 12 Drawing Sheets

DUPLEX FRAME HINGE FOR FARM IMPLEMENT

TECHNICAL FIELD

This invention relates to tillage and seeding equipment and, more particularly, a hinge for a multi-sectional farm implement.

BACKGROUND

It is well known in the art to provide multi-sectional tillage and seeding implements with hinges. The hinges allow adjacent sections of the implement to be folded relative to one another for road transportation and storage. The hinges also allow adjacent frame sections to flex during field operations. It is necessary that the frame section flex relative to one another because of the somewhat irregular and uneven ground. However, it is not desirable to allow adjacent frame sections to flex relative one another when being transported or stored.

Some sections may fold vertically or horizontally toward a stationary adjacent frame section. However, in some instances, both adjacent frame sections need to fold. In such case, it is desirable for adjacent frame sections to overlap in a compact and stable manner but then also unfold for field operations while allowing the adjacent frame sections to flex.

During field operations lateral forces act upon the ground engaging devices which may cause the frame to buckle. Also, because of the hinge between adjacent pivoting sections, the distance between disc blades on adjacent frame sections is varied which is undesirable as a result of these lateral forces. The location of the hinge point is important in minimizing buckling and maintaining the spacing between ground engaging devices of adjacent frame sections.

What is needed is a hinge for a pair of adjacent folding frame sections that has multiple pivot points that allow the sections to be folded in a compact manner and also allows the adjacent frame sections to flex relative one another for field operations but maintains ground engaging devices such as disc blades displaced at the appropriate distance.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the rear of the implement looking forwardly.

Figure 1:
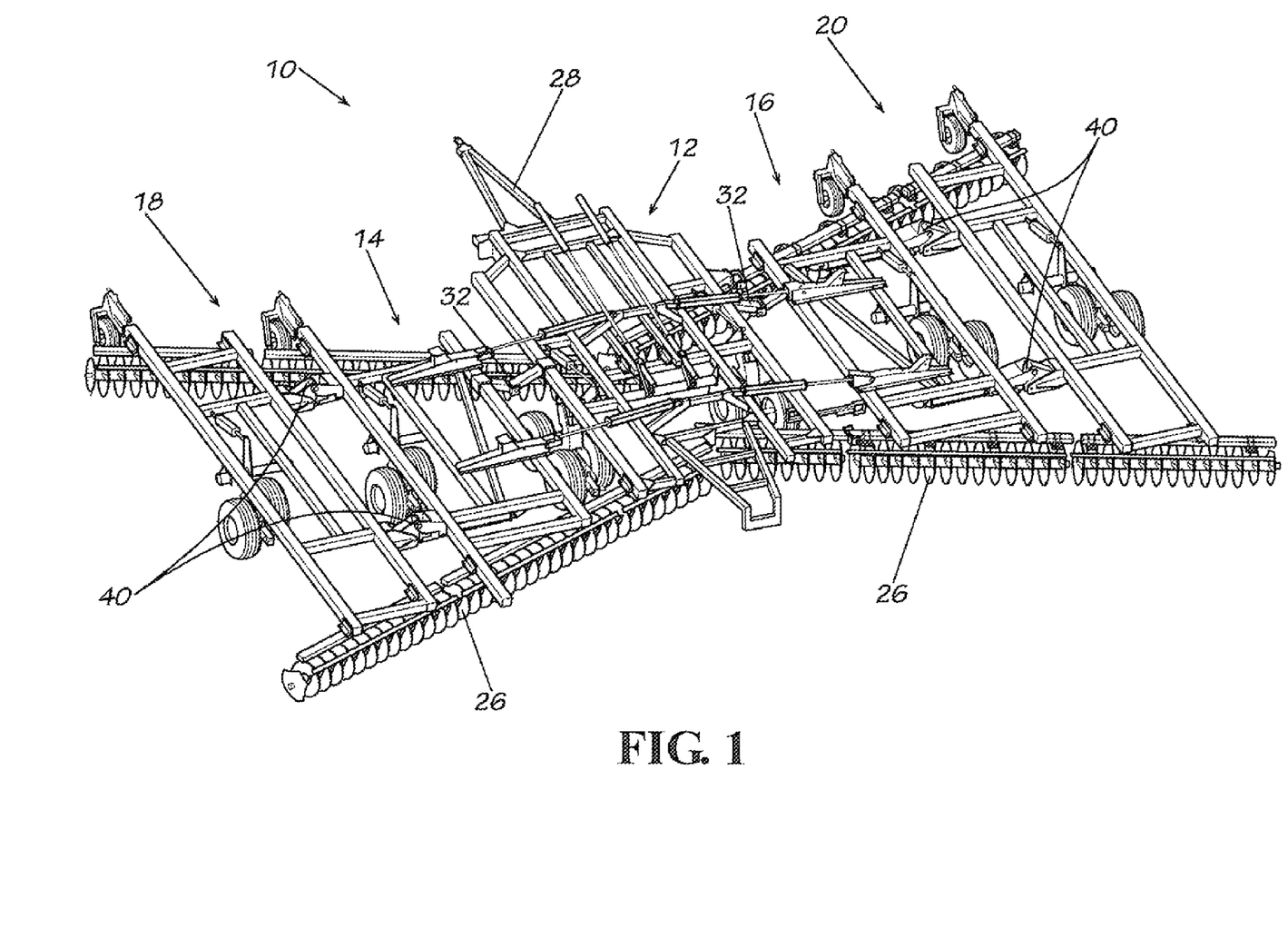
FIG. 1 is a left perspective view of a multi-sectional frame of a farm implement incorporating the principles of the present invention.

The tillage implement 10 illustrated in FIG. 1 is selected as but one of many different possible examples of machines with which the present invention may be utilized. In the illustrated embodiment, the implement 10 is a five-section folding implement comprising a center section 12, two inner wing sections 14 and 16 hingedly attached to opposite sides of center section 12, and two outer wing sections 18 and 20 hingedly attached to respective outer ends of the inner wing sections 14, 16. Inner wing sections 14, 16 can be raised into folded positions while outer wing sections 18, 20 can be folded onto inner wing sections 14, 16 as shown in FIG. 2.

Each of the sections 12, 14, 16, 18 and 20 may carry ground engaging devices such as tillage or seeding tools. For example, gangs of discs 26 work the soil as the implement 10 is advanced across the field. A tongue 28 projects forwardly from center section 12 for hitching the implement 10 to a towing vehicle. Each section 12, 14, 16, 18 and 20 has its own frame or chassis to which the tillage tools of that section are attached. Each section 12, 14, 16, 18 and 20 has its own undercarriage for supporting the chassis during field operations and, in the case of the undercarriage of center section 12, supporting the load of the entire implement 10 during transport when wing sections 14, 16, 18 and 20 are folded up. Each section 12, 14, 16, 18 and 20 also carries a wheel assembly preferably of the conventional walking beam type.

Between the center section 12 and both the inner wing sections 14, 16 conventional hinges 32 may be utilized when each of the inner wing sections 14, 16 require folding of no more than about ninety to one hundred ten degrees. However, a duplex hinge 40 according to the embodiments of the present invention may be used when a greater degree of folding is required to fold sections in a compact manner or to allow adjacent frame sections to flex relative one another for field operations and also maintain ground engaging devices displaced from one another at the appropriate distance. Therefore, between the inner wing sections 14, 16 and outer wing sections 18, 20 the duplex hinge 40 may be used. However, the duplex hinge 40 may be used between the center section 12 and the inner wing sections 14, 16 as well when greater than about one hundred and ten degrees of folding is desired.

Figure 2:
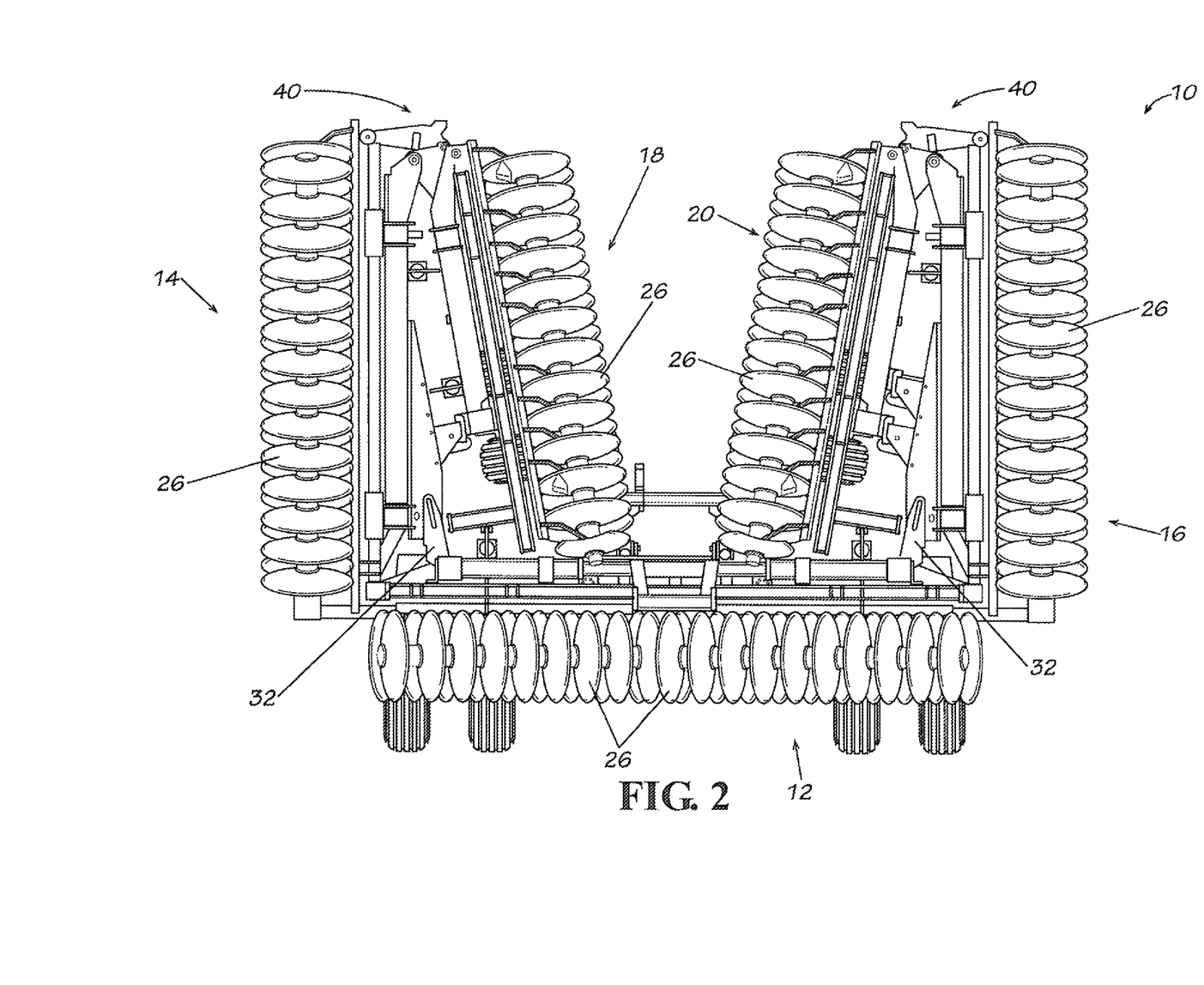
FIG. 2 is a rear view from above of the multi-sectional farm implement of FIG. 1 according to one embodiment of the present invention.

FIG. 2 illustrates the implement 10 folded for road transport or storage. The two outer wing sections 18, 20 are folded substantially on top of the two inner wing sections 14, 16. The two inner wing section 14, 16 are then folded relative the center section 12 such that each of the two inner wing sections 14, 16 are substantially ninety to one hundred ten degrees vertical. The two outer wing sections 18, 20 are folded approximately one hundred seventy to one hundred eighty degrees. The folding of the two outer wing sections 18, 20 may be referred to as the outside fold and the folding of the two inside wing sections 14, 16 may be referred to as the inside fold. However, other folding arrangements are contemplated with the use of the duplex hinge 40.

Figure 3:
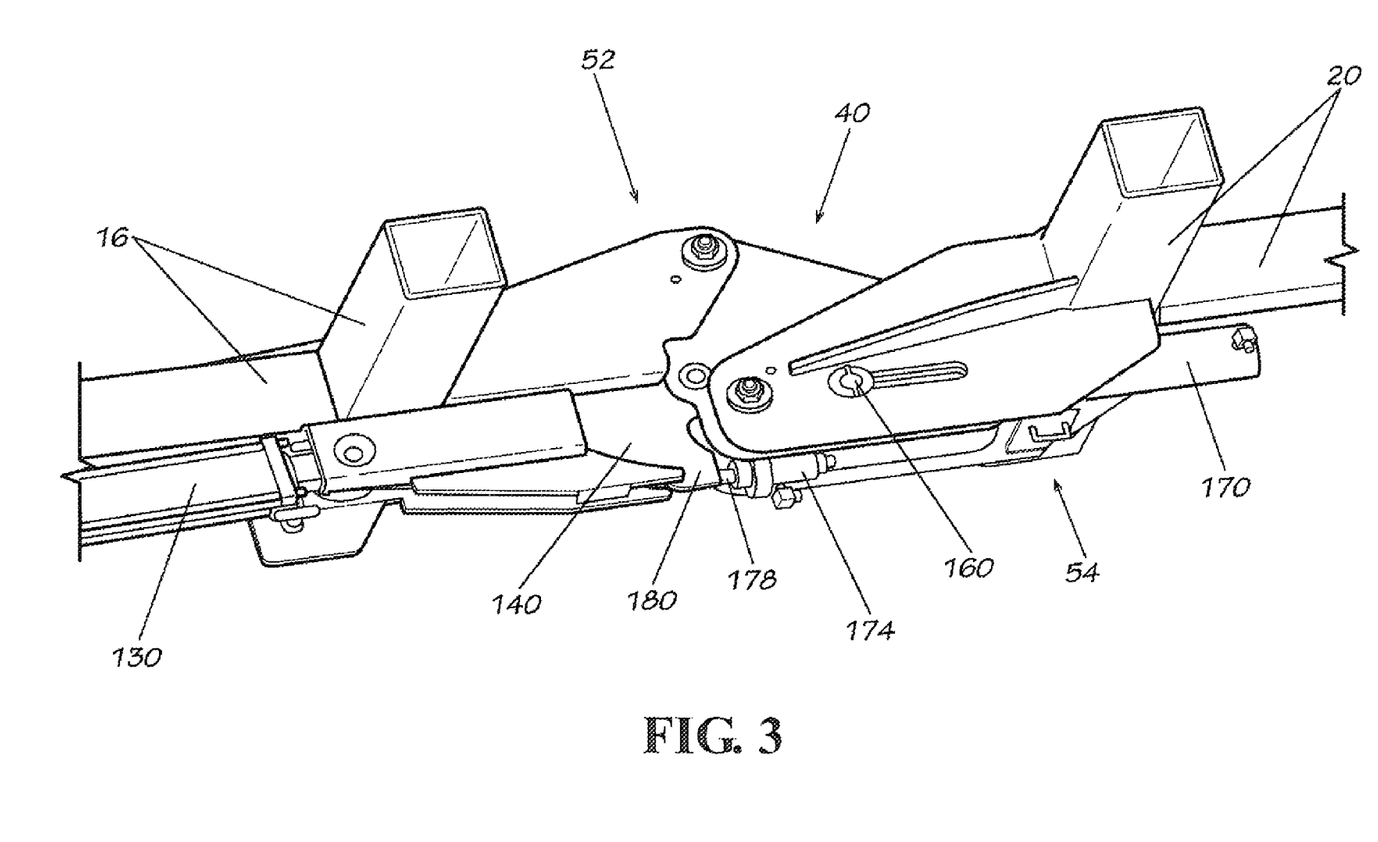
FIG. 3 is a perspective view from below of a duplex hinge of the implement of FIG. 1 in the unfolded position according to one embodiment of the present invention.
Figure 4:
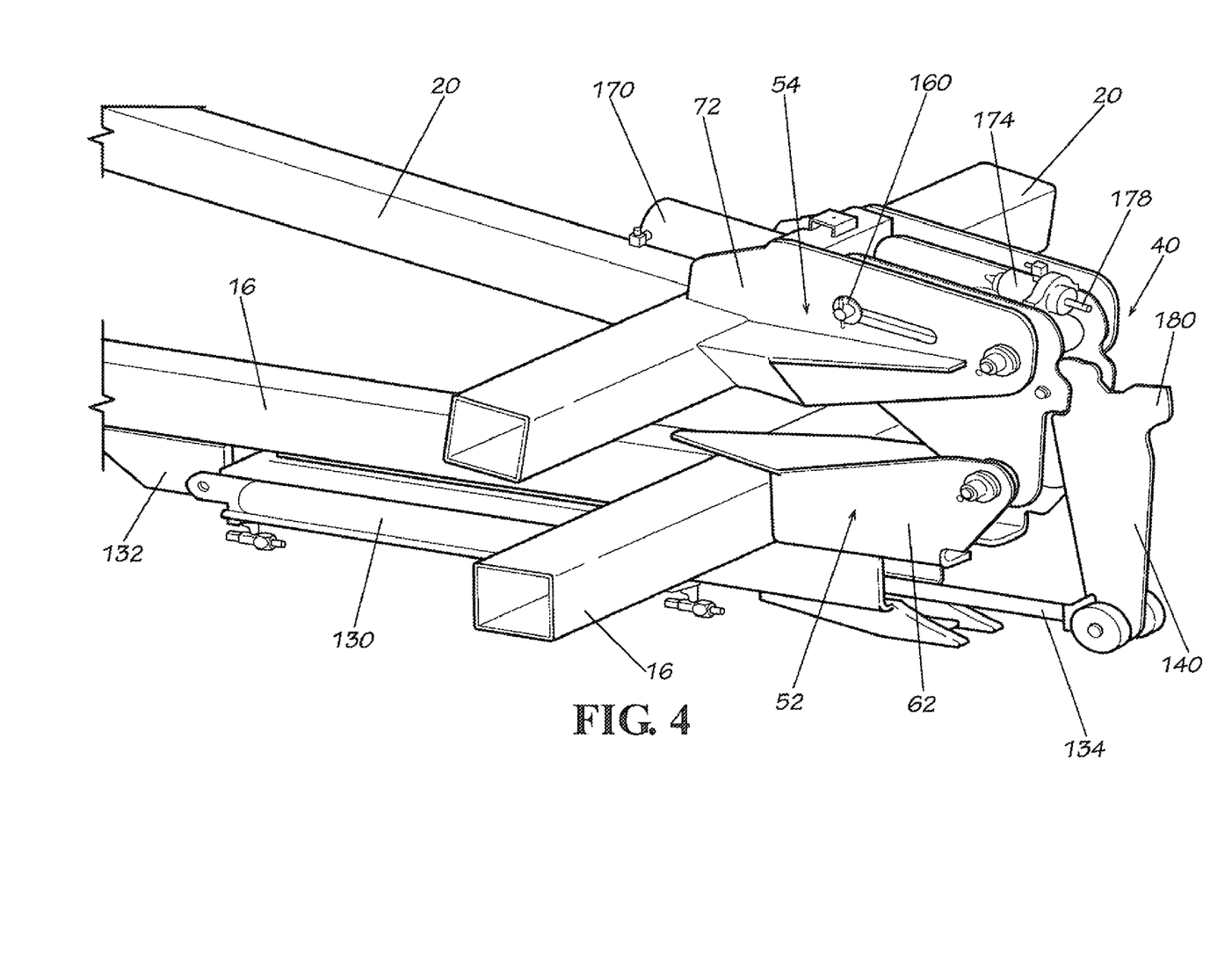
FIG. 4 is a rear perspective view of the duplex hinge of the implement of FIG. 1 in the folded position according to one embodiment of the present invention.
Figure 5:
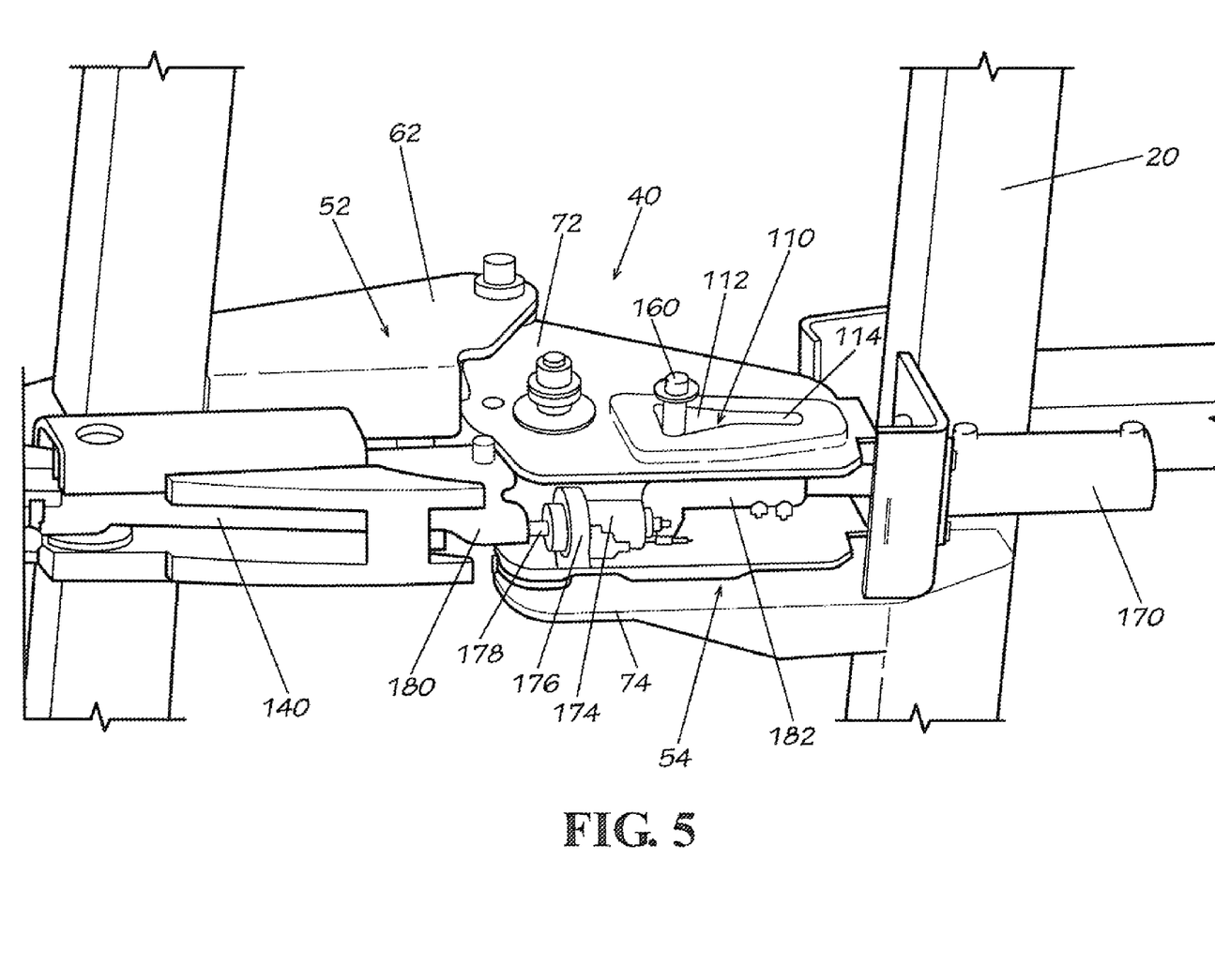
FIG. 5 is a bottom perspective view of the duplex hinge in the unfolded position with a portion of the end of a wing section removed to better depict the duplex hinge according to one embodiment of the present invention.

FIGS. 3-5 illustrate the duplex hinge 40 coupled between an end 52 of a first section such as inner wing section 16 and an end 54 of a second section such as outer wing section 20. Typically two ends of each adjacent section are coupled together with hinges. However, for the sake of simplicity in explaining the principles of the present invention, only one end of each adjacent section is illustrated as the primary example. FIG. 3 illustrates the sections 16, 20 unfolded for field operations and FIG. 4 illustrates the sections 16, 20 folded for transport or storage. FIG. 5 illustrates the duplex hinge 40 in the unfolded position with a portion of the end 54 of the outer wing section 20 removed to better depict the duplex hinge 40.

Figure 6:
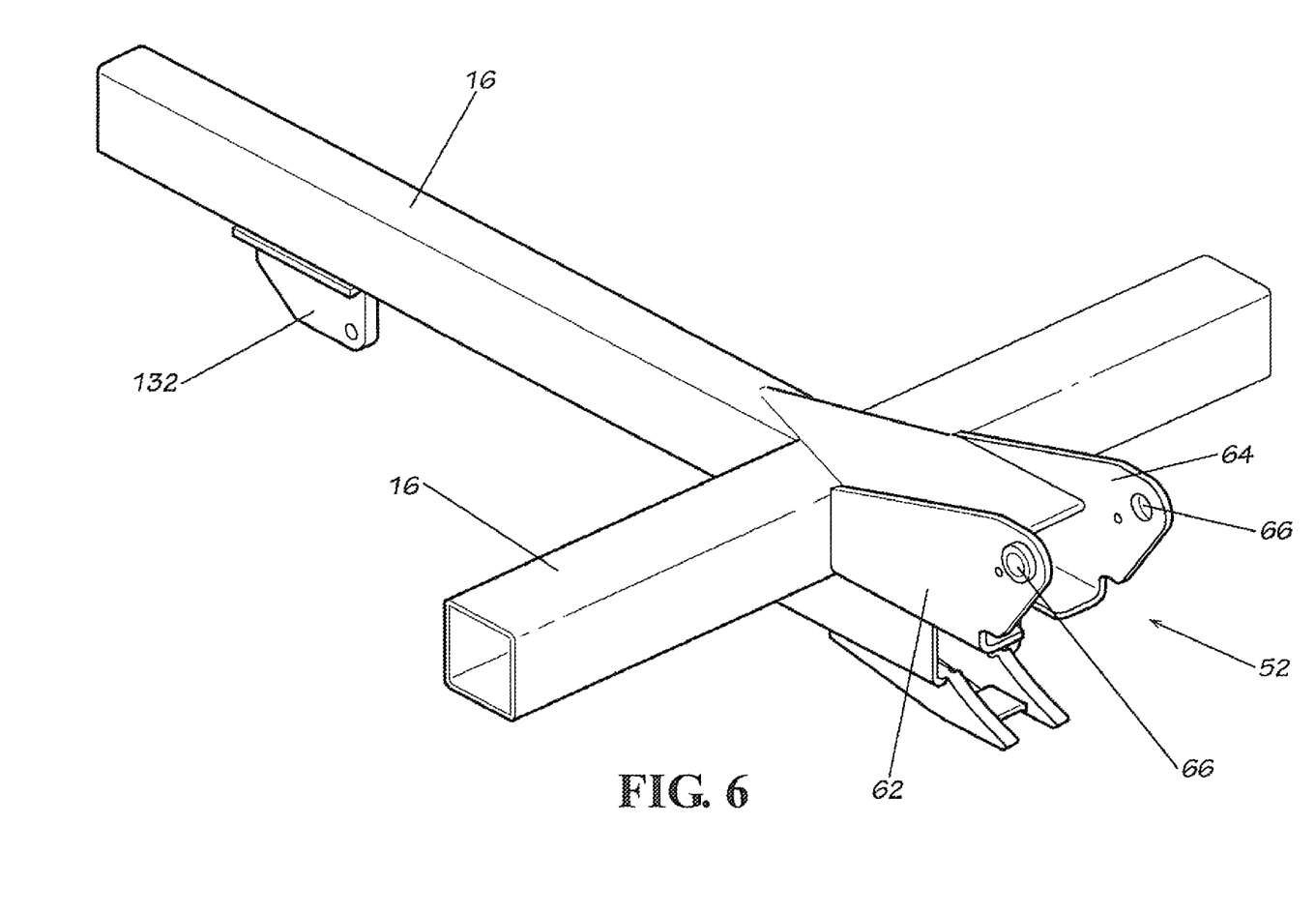
FIG. 6 is a rear perspective view of an end of an inner frame section for coupling with the duplex hinge according to one embodiment of the present invention.
Figure 8:
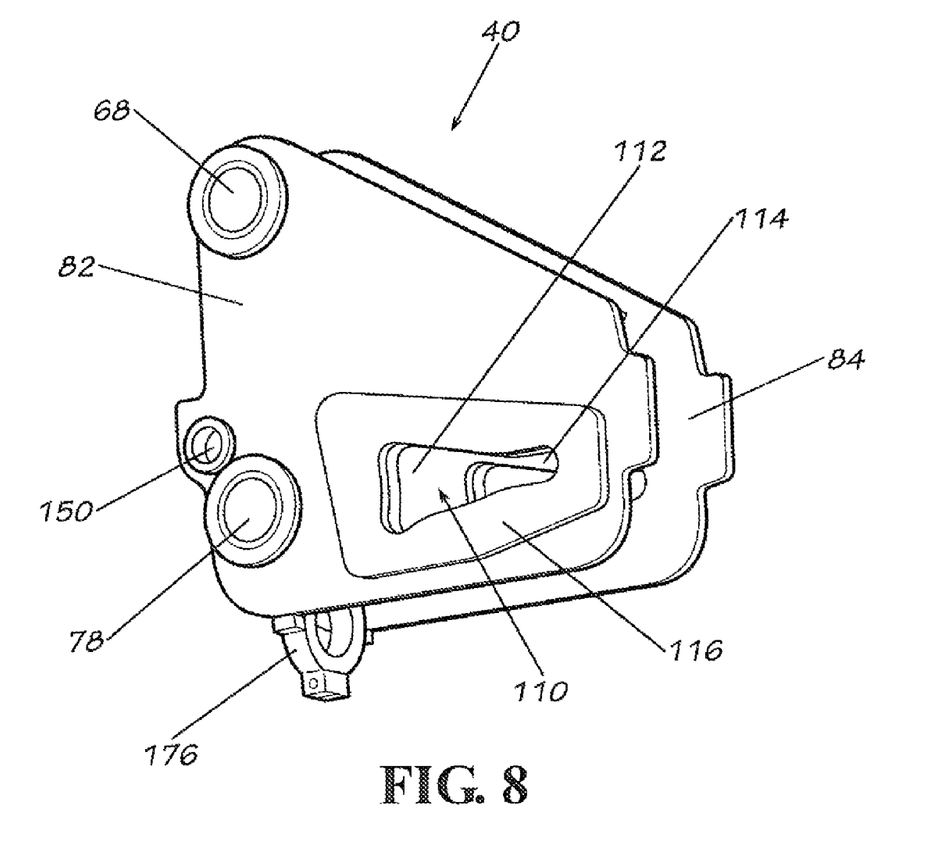
FIG. 8 is a rear perspective view of the duplex hinge according to one embodiment of the present invention.
Figure 9:
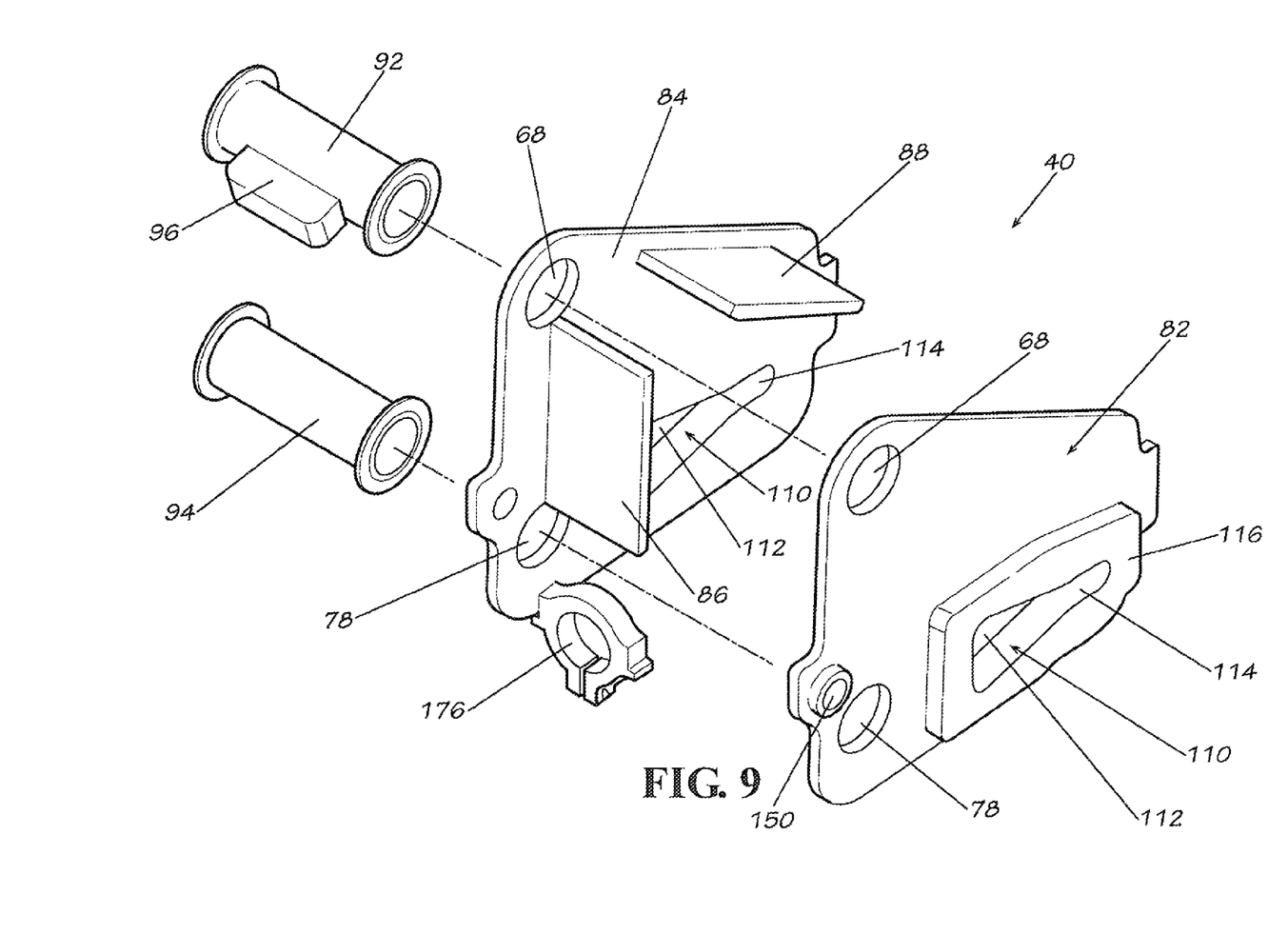
FIG. 9 is an exploded view of the hinge of FIG. 8.
Figure 10:
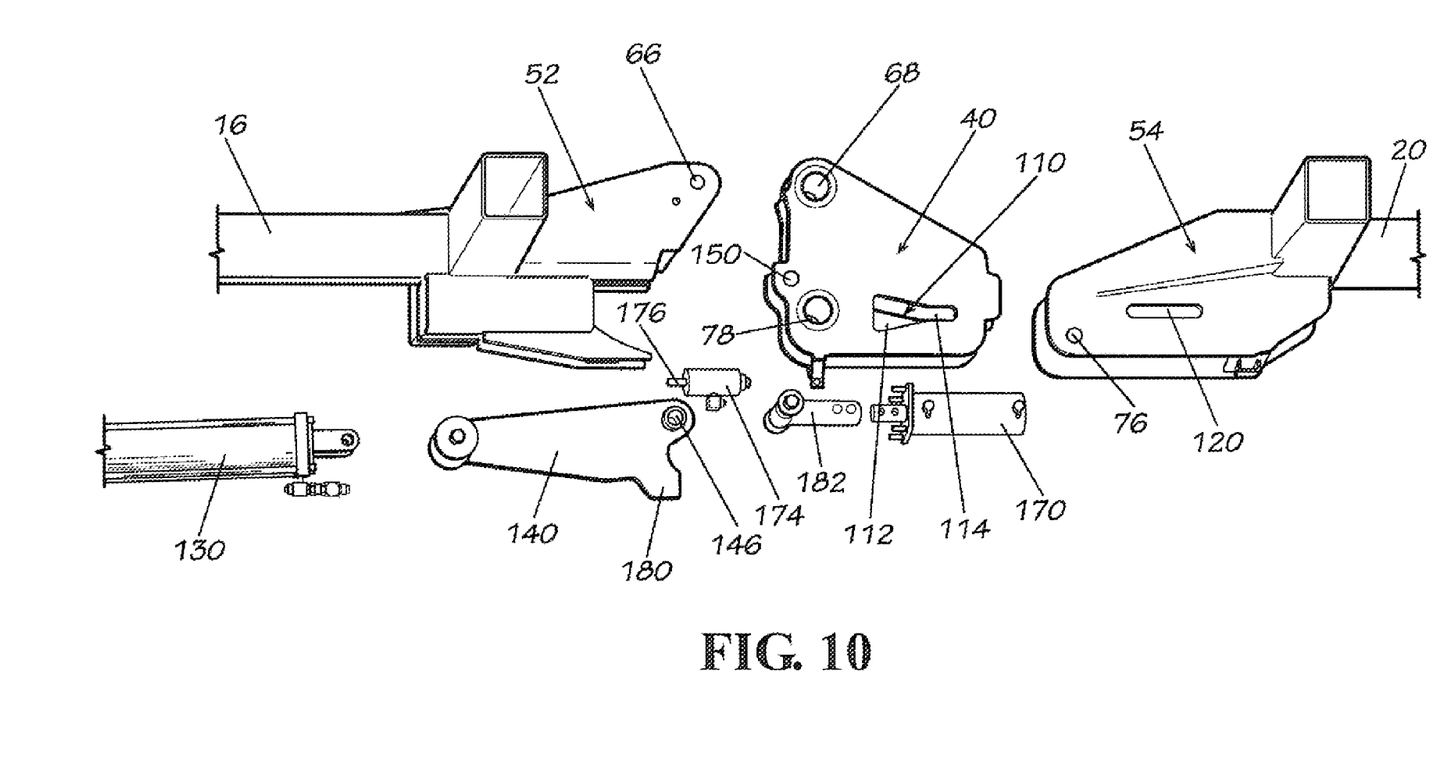
FIG. 10 is an exploded view of the duplex hinge between the ends of the inner and outer frame sections.

As best shown in FIG. 6, the end 52 of the inner section 16 includes two parallel, spaced apart and outwardly extending plates 62 and 64 for receiving the duplex hinge 40 between plates 62, 64. Each plate 62, 64 includes an aperture 66 which are in axial alignment with one another. The duplex-hinge 40 includes a first pair of apertures 68, as best shown in FIGS. 8 and 9, which are also in axial alignment with one another. When the duplex hinge 40 is received in the end 52 between plates 62 and 64, the apertures 68 of duplex hinge 40 and the apertures 66 of end 52 are aligned to correspond with one another and permit the duplex hinge 40 and end 52 to pivot relative to one another about a common axis or pivot point.

Figure 7:
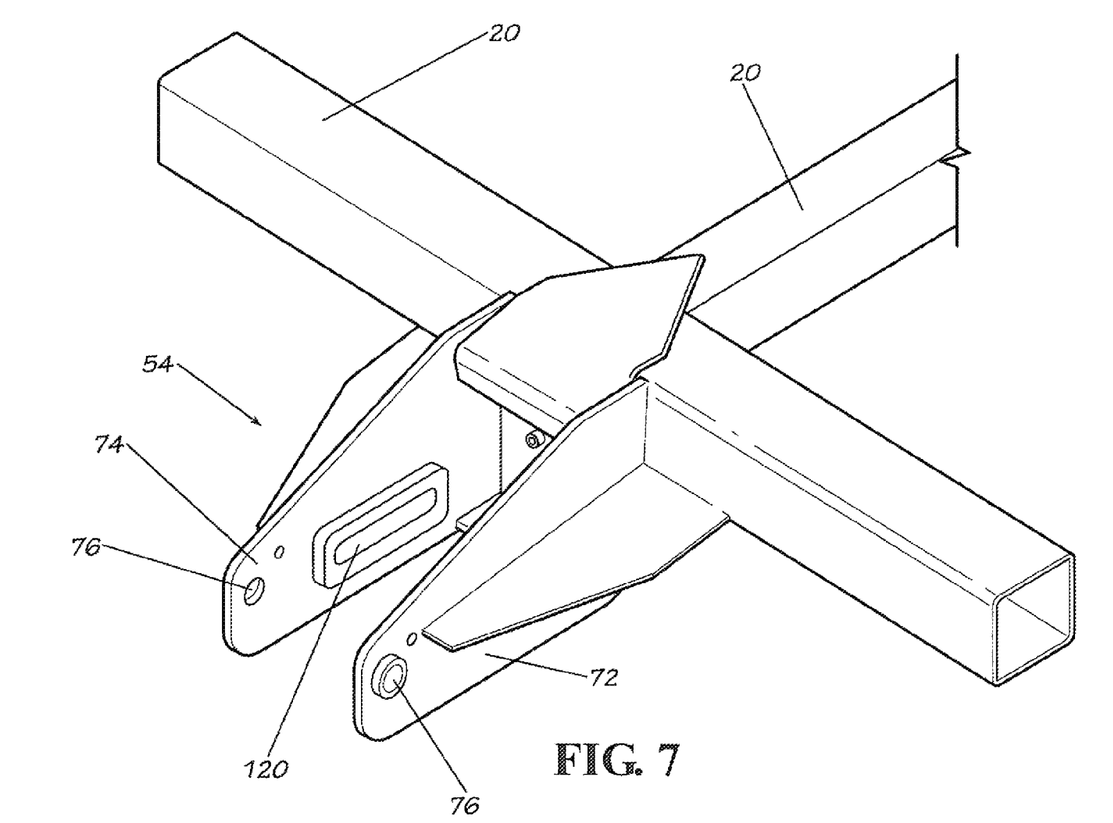
FIG. 7 is a rear perspective view of an end of the an outer frame section for coupling with the duplex hinge according to one embodiment of the present invention.

As best shown in FIG. 7, the end 54 of the outer section 20 includes two parallel, spaced apart and outwardly ending plates 72, 74. The duplex hinge 40 includes a second pair of apertures 78, as best shown in FIGS. 8 and 9, which are also in axial alignment with one another. Each plate 72, 74 includes an aperture 76 which are in axial alignment with one another. When the duplex hinge 40 is received in the end 54 between plates 72 and 74, the apertures 7.8 of duplex hinge 40 and the apertures 76 of end 54 are aligned to correspond with one another and permit the duplex hinge 40 and end 54 to pivot relative to one another about a common axis or pivot point.

As best shown in FIGS. 8 and 9, the duplex, hinge 40 is an assembly that includes parallel and spaced apart side plates 82 and 84. Between adjacent side plates 82, 84 are one or more reinforcing members such cross members 86, 88. A pivot sleeve 92 is positioned through the apertures 76 of the side plates 82, 84 and a pivot sleeve 94 is positioned through the apertures 86 of the side plates 82, 84. The pivot sleeve 92 includes an abutment block 96 as best shown in FIG. 9.

Each side plate 82, 84 of the duplex hinge 40 also includes an elongated slot 110. The slots 110 correspond with each other and each slot 110 includes two portions where a first portion 112 is wider than a second portion 114 as best shown in FIGS. 8 and 9. Preferably the first portions 112 are generally triangular in shape where a vertex of the triangle intersects with an end of a corresponding generally obround shaped second portion 114. The first and second potions 112, 114 communicate with one another to define each of the slots 110. Preferably, each slot 110 includes a reinforcement plate 116 on the outside of each side plate 82, 84. The reinforcement plates 116 substantially surround the periphery of each slot 110 such that an opening in each reinforcement plate corresponds with the shape of the corresponding slot 110.

Referring to FIG. 7, each plate 72, 74 of end 54 includes a slot 120 (only one shown) which correspond with one another. Each slot 120 may have a reinforcing plate 118 preferably on the inside of each plate 72, 74 (only one shown) which correspond with the shape of each slot 120. Each slot 120 is generally obround and preferably corresponds in length with the slots 110 of duplex hinge 40 when the duplex hinge 40 is coupled to the end 54. The second portions 114 of slots 110 also preferably correspond in width with one end of the slots 120. However, the opposite ends of slots 120 are preferably narrower in width that the first portions 112 of slots 110 because of the generally triangular shape at the end of slots 110. Therefore, the slots 120 only partially correspond with the slots 110.

To fold the outer wing section 20, a hydraulic cylinder 130 coupled to member 132 of section 16 extends a rod 134. The rod 134 is coupled to a lever 140. The lever 140 is coupled to the duplex hinge 40 through an aperture 146 of the lever 140. The duplex hinge 40 includes a set of corresponding apertures 150 to pivotally receive the lever 140. When the rod 134 of the cylinder 130 extends and retracts the lever 140 pivots about an axis at aperture 146 that extends between the apertures 150 of duplex hinge 40. When folding and the outer wing section 20 goes over about one hundred ten degrees or over center, the abutment block 96 of the duplex hinge 40 comes into contact with an edge of the lever 140 which prevents further rotation of the lever 140 with respect to the duplex hinge 40 because of the weight of the section 20. At this point the rod 134 of cylinder 130 goes from compression to tension. The abutment block remains in contact with the lever 140 while the section 20 is folded more than about one hundred and ten degrees. The rod 134 of cylinder 130 may be used in conjunction with rollers and a ramp within a channel to facilitate control of the folding action as known to those skilled in the art.

When the rod 134 of the cylinder 130 is extended, the lever 140 pivots at its pivot point and the duplex hinge 40 rotates about a pivot point P1 defined between apertures 68 of the duplex hinge 40 and the corresponding apertures 66 of end 52. When the rod 134 is fully extended, as shown in FIG. 4, the duplex hinge 40 is rotated upward about pivot point P1. When the rod 134 of cylinder 130 is retracted, the duplex hinge 40 is rotated downward about pivot point P1. When the rod 134 is extended and retracted to fold and unfold the wing section 20, it is preferable that the duplex hinge 40 only pivot about pivot point P1. Preferably, pivot point P1 is always active when the implement 10 is in either the folded or unfolded configuration.

A pivot point P2 is defined between the apertures 76 of end 54 of section 20 and the apertures 78 of the duplex hinge 40. The sections 16 and 20 should be free to flex relative to one another when the sections 16, 20 are unfolded for field operations as shown in FIGS. 3 and 5. In such case, pivot point P2 is active to allow flexing. However, when folding and unfolding the sections 16, 20, the duplex hinge 40 and the section 20 may be locked relative to one another to prevent pivoting about pivot point P2. In such case, pivot point P2 is inactive or rigid.

Figure 13:
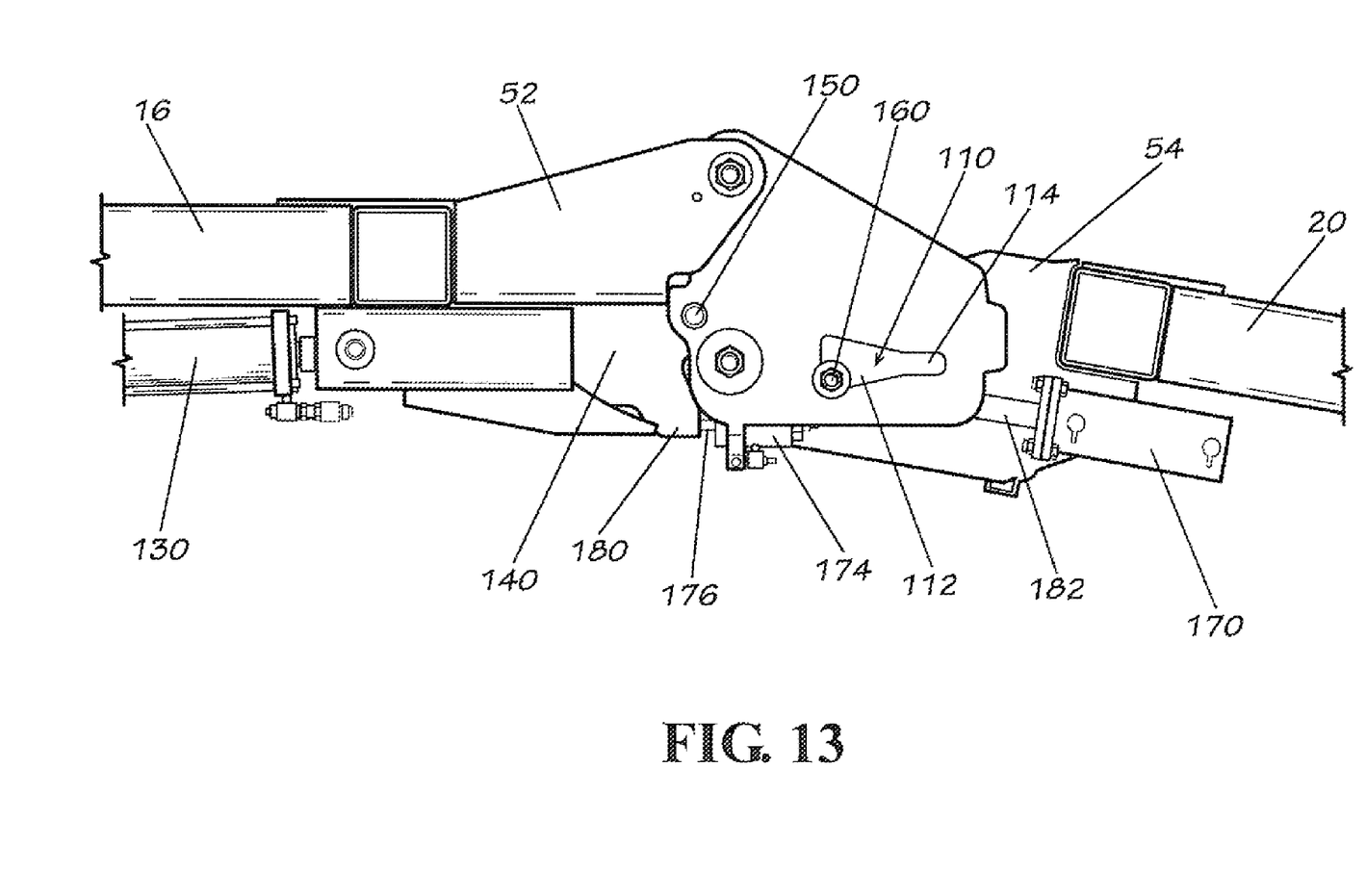
FIG. 13 is a side view of the duplex hinge with a portion of the end of the outer wing section removed where the outer wing section is allowed to flex below a horizontal line corresponding with the inner wing section according to one embodiment of the present invention.

A moveable or sliding lock pin 160 may be utilized in corresponding slots 110 and 120 of the duplex hinge 40 and end 54 of section 20, respectively, to lock and unlock pivot point P2. When the pin 160 is received through slots 110, 120 and is slid to one side as best shown in FIGS. 3 and 5, the duplex hinge 40 and section 20 are free to flex for field operations because the pivot point P2 is unlocked. Because the first portions 112 of slots 110 are wider than slots 120 of end 54, the pin 160 still permits an amount of flexing that corresponds to the width of first portions 112 of slots 110. The outer wing section 20 is pivoting about the lower pivot point P2 at this time. The shape of the enlarged ends of the slots 110 define the degree of flexing that is permitted. Preferably, the section 20 would be allowed to flex up and down approximately ten degrees. FIG. 13 illustrates when pivot point P2 is active allowing the outer wing section 20 to flex below a horizontal line corresponding with the inner wing section 16 according to one embodiment of the present invention.

As best shown in FIG. 4, when the pin 160 is slid to the opposite side of the slots 110, 120, the duplex hinge 40 and section 20 are locked about pivot point P2 because the width of the second portions of slot 110 corresponds with the width of the slots 120. The pin 160 may be slid in slots 110, 112 by a hydraulic cylinder 170. The cylinder 170 operates in conjunction with a check valve 174 to activate and inactivate pivot point P2. The check valve 174 prevents the cylinder 170 from inadvertently extending and unlocking the duplex hinge 40 about pivot point P2 due to pressure fluctuations and reversal during folding and unfolding. A mount 176 is positioned between the side plates 82, 84 of the duplex hinge 40 to receive and retain the check value 174. A plunger 178 on the check valve 174 engages an abutment 180 on the lever 140 when the section 20 is unfolded for field operations. This allows the cylinder 170 to extend its rod 182 and disengage the pin 160 by sliding the pin 160 to the end of the slots 110, 120 corresponding with first portions 112 of slots 110. When in other than the unfolded position for folding and unfolding, the rod 182 of cylinder 170 is retracted to lock the duplex hinge 40 about pivot point P2. The plunger 178 disengages the abutment 180 of lever 140 and the pin 160 is slid back to the opposite end of the slots 110, 112 where the widths of the slots 110, 120 are generally the same.

However, the check valve 174 is not the only way to sequence the lock cylinder 170. Other types of valves may such as relief valves could also be used to engage the cylinder 170 prior to folding.

Figure 11:
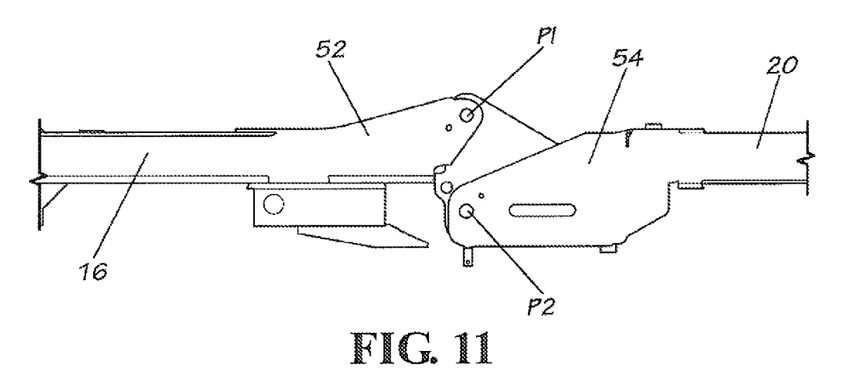
FIGS. 11 and 12 illustrate the positions of the pivot points of the duplex hinge while in the unfolded and folded positions, respectively.
Figure 12:
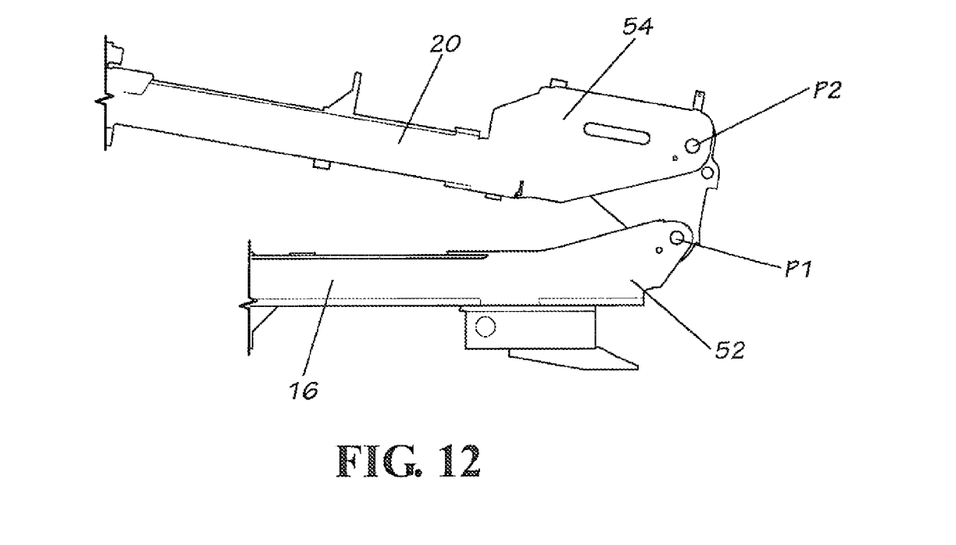

As best shown in FIGS. 11 and 12, the pivot point P1 is higher than the pivot point P2 when section 20 is unfolded for field operations. However, when the section 20 is folded relative the section 16, the pivot point P1 is then lower than pivot point P2. Pivot points P1 and P2 are displaced from one another enough for proper folding clearance. However, it is preferably to have pivot point P2 as close as possible to the ground to prevent buckling and to sufficiently maintain the distance between adjacent discs.

In some embodiments, the hydraulic cylinders may instead be a number of different devices such as a turnbuckle or an actuator like an electrically powered linear actuator.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A hinge for a multi-sectional farm implement comprising first and second pivot points, said first pivot point for pivotally coupling a first section of the multi-sectional farm implement to said hinge, said second pivot point for pivotally coupling a second section of the multi-sectional farm implement to said hinge, wherein the hinge has a first slot formed therein that receives a movable pin, said first slot partially corresponding with a second slot formed in said second section when said hinge is coupled to said second section, wherein said first slot comprises:

a first portion that is wider in width than a corresponding first portion of said second slot of said second section; and a second portion that corresponds in width to a corresponding second portion of said second slot of said second section, wherein said movable pin is received in said wider first portion of said first slot and said corresponding first portion of said second slot of said second section when said second section is unfolded to allow said second section to pivot about said second pivot point, and said moveable pin is moved in said first and second slots to said corresponding second portions to prevent said second section from pivoting about said second pivot point when folding said second section relative to said first section such that said second section pivots only about said first pivot point to fold said second section relative to said first section and wherein said first section pivots about said first pivot point relative to said hinge and said second section pivots about said second pivot point relative to said hinge when said second section is unfolded relative to said first section.

2. The hinge of claim 1 wherein said first pivot point is higher than said second pivot point when said second section is unfolded.

3. The hinge of claim 1 wherein said first pivot point is lower that said second pivot point when said second section is folded.

4. The hinge of claim 1 wherein said second pivot point is below said first section when said second section is unfolded for conducting field operations.

5. A foldable farm implement comprising:

at least one hinge;

a first section coupled to said hinge at a first pivot point; and a second section coupled to said hinge at a second pivot point, said first pivot point active to allow pivoting between said hinge and said first section when said second section is unfolded relative to said first section for field operations and when folding said second section relative to said first section, said second pivot point active when said second section is unfolded relative to said first section for field operations and rigid when folding said second section relative to said first section, wherein said second pivot point moves between a lower position and a higher position relative said first pivot point when said second section is moved from an unfolded position to a folded position.

6. The foldable farm implement of claim 5, wherein said second pivot point moves between a lower position and a higher position relative said first section when said second section is in an unfolded position and a folded position, respectively.

7. The foldable farm implement of claim 5 wherein said hinge comprises a first slot and said second section comprising a second slot wherein said first and second slots partially correspond with one another when said hinge is coupled to said second section.

8. The foldable farm implement of claim 7 further comprising a moveable pin received in said first and second slots, said pin received in a wider first portion of said first slot and a corresponding first portion of said second slot of said second section when said second section is unfolded to allow said second section to pivot about said second pivot point.

9. The foldable farm implement of claim 8 wherein said moveable pin is moved in said first and second slots to said corresponding second portions to prevent said second section from pivoting about said second pivot point when folding said second section relative to said first section.

10. The foldable farm implement of claim 7 further comprising a moveable lock received in said first and second slots, said lock received in a wider first portion of said first slot and a corresponding first portion of said second slot of said second section when said second section is unfolded to allow said second section to pivot about said second pivot point.

11. The foldable farm implement of claim 5 further comprising a first cylinder to lock said hinge to fix said second pivot point and to unlock said hinge to activate said second pivot point.

12. The foldable farm implement of claim 11 wherein said first cylinder slides a pin in a slot of said hinge and a slot of said second section to active and inactivate said second pivot point.

13. The foldable farm implement of claim 11 further comprising a check valve to prevent said first cylinder from unlocking said hinge at said second pivot point when said second section is in other than in the unfolded position for field operations.

14. The foldable farm implement of claim 13 wherein said check valve engages a lever coupled between a second cylinder and said hinge when said second section is unfolded for field operations.

15. The foldable farm implement of claim 14 wherein said check valve disengages said lever such that said first cylinder may lock said hinge and said second section may not pivot about said second pivot point when said second section is in other than the unfolded position for field operations.

16. The foldable farm implement of claim 14 wherein said check valve engages said lever such that said first cylinder may unlock said hinge and said second section may pivot about said second pivot point when said second section is in the unfolded position for field operations.

17. A method of folding a multi-sectional farm implement comprising the steps of:
pivoting a first section of the multi-sectional farm implement about a first pivot point of a hinge and pivoting a second section of the multi-sectional farm implement about a second pivot point of said hinge when said first and second sections are unfolded relative one another, wherein said second pivot point moves between a lower position and a higher position relative said first pivot point when said second section is moved from an unfolded position to a folded position; and
pivoting only about said first pivot point when folding said second section into a folded position relative said first section.

18. The method of claim 17 further comprising the step of locking said hinge to said second section to preclude said second section from pivoting about said second pivot point.

19. The method of claim 18 further comprising the step of folding said second section relative to said first section about said first pivot point.

20. The method of claim 17 further comprising the step of engaging a check valve to prevent inadvertent pivoting about said second pivot point when said second section is in other than in the unfolded position for field operations.

21. A method of folding a multi-sectional farm implement, said method comprising the steps of:
pivoting about a first pivot point between a hinge and a first section to fold said first section relative to a second section and to allow said first and second section to flex relative to one another during field operations;
activating a second pivot point of said hinge and said second section to allow said first and second section to flex relative to one another during field operations; and
fixing said second pivot point of said hinge and said second section for folding said first section relative to a second section, wherein said second pivot point moves between a lower position and a higher position relative said first pivot point when said second section is moved from the unfolded position for field operations to a folded position.

* * * * *